United States Patent
Yu

(10) Patent No.: US 12,298,800 B2
(45) Date of Patent: May 13, 2025

(54) HALL JOYSTICK

(71) Applicant: SHENZHEN GULI TECHNOLOGY CO., LTD., Shenzhen (CN)

(72) Inventor: Hongyong Yu, Shenzhen (CN)

(73) Assignee: SHENZHEN GULI TECHNOLOGY CO., LTD., Shenzhen (CN)

( * ) Notice: Subject to any disclaimer, the term of this patent is extended or adjusted under 35 U.S.C. 154(b) by 253 days.

(21) Appl. No.: 17/715,063

(22) Filed: Apr. 7, 2022

(65) Prior Publication Data
US 2022/0342438 A1  Oct. 27, 2022

(30) Foreign Application Priority Data

Apr. 21, 2021  (CN) .......................... 202120831610.1
Apr. 25, 2021  (CN) .......................... 202120864065.6

(51) Int. Cl.
G05G 9/047  (2006.01)

(52) U.S. Cl.
CPC ... G05G 9/047 (2013.01); *G05G 2009/04755* (2013.01)

(58) Field of Classification Search
CPC .......... G05G 9/047; G05G 2009/04755; A63F 13/24; A63F 13/90; A63F 13/98
See application file for complete search history.

(56) References Cited

U.S. PATENT DOCUMENTS

| | | | | |
|---|---|---|---|---|
| 4,660,671 A | * | 4/1987 | Behr | B62D 5/0463 |
| | | | | 180/404 |
| 4,825,157 A | * | 4/1989 | Mikan | G05G 9/047 |
| | | | | 324/207.16 |
| 5,113,714 A | * | 5/1992 | Eklund | G05G 9/04788 |
| | | | | 248/65 |
| 5,160,918 A | * | 11/1992 | Saposnik | G05G 9/047 |
| | | | | 345/161 |
| 5,656,901 A | * | 8/1997 | Kurita | A63F 13/803 |
| | | | | 434/45 |
| 5,727,188 A | * | 3/1998 | Hayes | A63F 13/245 |
| | | | | 434/45 |
| 5,823,876 A | * | 10/1998 | Unbehand | A63F 13/285 |
| | | | | 463/37 |

(Continued)

FOREIGN PATENT DOCUMENTS

| | | | | |
|---|---|---|---|---|
| CN | 101315569 A | * | 12/2008 | ............. G01R 33/09 |
| CN | 101315569 B | | 6/2010 | |

(Continued)

*Primary Examiner* — Chase E Leichliter

(57) ABSTRACT

A Hall joystick is disclosed, including: a main body having a first side surface and a second side surface; a first side cap and a second cap that are respectively fixed to the first side surface and the second side surface; a first rotating member and a second rotating member that are rotatably connected to the first side cap and the second side cap, where each of the first and the second rotating member has a magnet; a stick partly received in the main body and having a lower end rotatably connected to the main body; a transmission member movably arranged in the main body and used to transmit a rotational motion from the stick to the first rotating member and the second rotating member; and a first Hall element arranged within the first side cap, and a second Hall element arranged within the second side cap.

10 Claims, 10 Drawing Sheets

(56) References Cited

U.S. PATENT DOCUMENTS

| | | | |
|---|---|---|---|
| 5,829,745 A * | 11/1998 | Houle | A63F 13/24 463/47 |
| 5,868,573 A * | 2/1999 | Kerby | A63F 13/245 434/62 |
| 5,969,520 A * | 10/1999 | Schottler | G05G 9/047 324/207.2 |
| 5,989,123 A * | 11/1999 | Tosaki | A63F 13/803 463/47 |
| 6,020,875 A * | 2/2000 | Moore | A63F 13/428 345/157 |
| 6,050,897 A * | 4/2000 | Suzuki | A63F 13/245 463/37 |
| 6,159,099 A * | 12/2000 | Chen | A63F 13/245 463/6 |
| 6,203,432 B1 * | 3/2001 | Roberts | A63F 13/803 463/36 |
| 6,283,859 B1 * | 9/2001 | Carlson | G06F 3/016 463/36 |
| 6,480,183 B1 * | 11/2002 | Van Ruymbeke | G05G 9/047 324/660 |
| 6,573,709 B1 * | 6/2003 | Gandel | G01B 7/02 324/207.2 |
| 6,909,353 B2 * | 6/2005 | Romero Herrera | G05G 9/047 338/12 |
| 7,775,884 B1 * | 8/2010 | McCauley | A63F 13/335 463/39 |
| 8,920,240 B2 * | 12/2014 | Jaouen | A63F 13/245 463/47 |
| 9,884,250 B2 * | 2/2018 | Jaouen | A63F 13/245 |
| 10,039,973 B2 * | 8/2018 | Osawa | A63F 13/00 |
| 10,716,999 B2 * | 7/2020 | Jaouen | A63F 13/803 |
| 11,442,489 B2 * | 9/2022 | Bonnici | G05G 9/047 |
| 2001/0052893 A1 * | 12/2001 | Jolly | G06F 3/0338 345/156 |
| 2002/0128064 A1 * | 9/2002 | Sobota | A63F 13/245 463/37 |
| 2003/0067111 A1 * | 4/2003 | Swan | A63F 13/98 463/36 |
| 2003/0137394 A1 * | 7/2003 | Romero Herrera | H01C 10/103 338/128 |
| 2004/0104887 A1 * | 6/2004 | Tsukamoto | G06F 3/016 345/156 |
| 2006/0197741 A1 * | 9/2006 | Biggadike | G05G 5/03 345/156 |
| 2007/0077783 A1 * | 4/2007 | Becker | B60R 16/027 324/207.2 |
| 2007/0262959 A1 * | 11/2007 | Gu | G05G 9/047 345/161 |
| 2008/0140340 A1 * | 6/2008 | Barthomeuf | B62D 15/0235 702/151 |
| 2008/0297328 A1 * | 12/2008 | Crawford | A63F 13/285 340/407.2 |
| 2009/0122006 A1 * | 5/2009 | Nielsen | A63F 13/358 345/156 |
| 2010/0044144 A1 * | 2/2010 | Tajima | B62D 5/0427 180/443 |
| 2010/0048308 A1 * | 2/2010 | Lee | A63F 13/803 463/47 |
| 2010/0163333 A1 * | 7/2010 | Patil | B62D 15/0245 180/402 |
| 2010/0173711 A1 * | 7/2010 | Jaouen | G05G 9/047 29/592.1 |
| 2011/0256930 A1 * | 10/2011 | Jaouen | A63F 13/803 463/37 |
| 2011/0281649 A1 * | 11/2011 | Jaouen | A63F 13/803 463/36 |
| 2014/0094310 A1 * | 4/2014 | Bleich | G07F 17/3209 463/38 |
| 2015/0119145 A1 * | 4/2015 | Jaouen | A63F 13/245 463/37 |
| 2018/0272233 A1 * | 9/2018 | Jaouen | A63F 13/803 |
| 2018/0356854 A1 * | 12/2018 | Spiteri | G01D 5/26 |
| 2020/0269130 A1 * | 8/2020 | Provancher | A63F 13/24 |
| 2022/0342438 A1 * | 10/2022 | Yu | G05G 9/047 |

FOREIGN PATENT DOCUMENTS

| | | | |
|---|---|---|---|
| CN | 102568906 A | | 7/2012 |
| CN | 103854910 A | * | 6/2014 |
| CN | 204215369 U | * | 3/2015 |
| CN | 205609414 U | | 9/2016 |
| CN | 206950639 U | | 2/2018 |
| CN | 206995811 U | * | 2/2018 |
| CN | 206996811 U | | 2/2018 |
| CN | 212135269 U | * | 12/2020 |
| JP | WO0113194 A1 | | 2/2001 |
| WO | WO-0113194 A1 | * | 2/2001 | G05G 9/047 |

* cited by examiner

HALL JOYSTICK

CROSS REFERENCE TO RELATED APPLICATIONS

This application claims priority on Patent Application Nos. 202120831610.1 and 202120864065.6, which are filed in People's Republic of China on Apr. 21, 2021 and Apr. 25, 2021, which are hereby incorporated by reference herein as if set forth in its entirety.

BACKGROUND

1. Technical Field

The present disclosure generally relates to joysticks, and particularly to a Hall joystick.

2. Description of Related Art

With the improvement of living standards, people's leisure activities are becoming more and more various. Electronic gaming devices that incorporate various functions, such as leisure and entertainment, intellectual development, emotional intelligence development, and even exercise and fitness are more and more popular. As an important component of electronic gaming devices, the joystick switch (also known as joystick) of a gaming controller is an important part for a user to control electronic games.

Some conventional joysticks may include a frame, a first rotating member, a second rotating member, a stick, a rod seat and a base. The first rotating member is rotatably mounted on the frame. The second rotating member extends in a direction orthogonal to the longitudinal direction of the first rotating member and is rotatably mounted on the frame. The stick can be tilted and the top of the stick extends out of the frame. The rod seat is movable and arranged in an axial direction of the stick. The base is arranged at the lower part of the frame. A spring is usually arranged between the stick and the rod seat, and the spring is to return the stick to its original position. Electronic components are mounted on a housing.

These conventional joysticks have the following drawbacks: the electronic components are mounted on the housing and are located outside the frame, which makes the electrical components protrude from the whole, resulting in a large product size and hindering the integrated development of products. In addition, there are many parts and the structure is complicated, resulting in low production efficiency.

Some analog control joysticks on the market generally adopt the resistive film structure, which is simple in structure and low in cost. However, because of the sliding rheostat structure that the metal or carbon brush slides directly on the resistive film to detect the position of the joysticks, these joysticks suffer from the problems of short service life, easy drift, and low precision. Trackball Hall sensors use 4 Hall devices to calculate the positions on the X and Y axes. Multiple Hall devices may suffer from the problems of high failure rate, high cost and complex calculation.

Therefore, there is a need to provide a Hall joystick to overcome above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
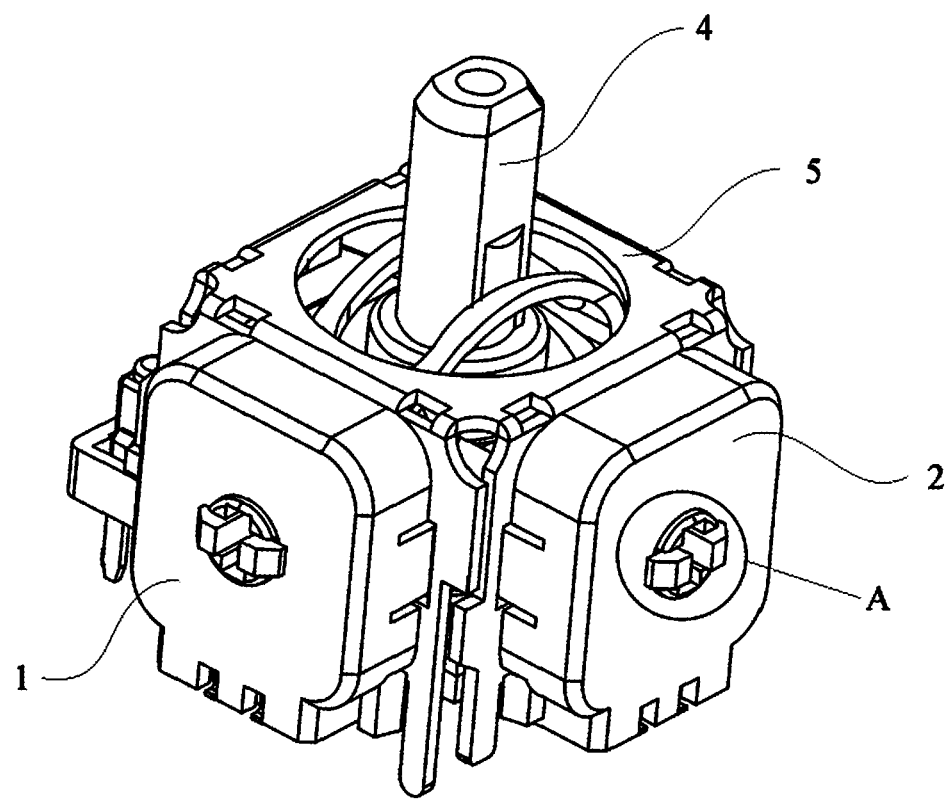
FIG. 1 is a schematic isometric view of a Hall joystick according to one embodiment.
Figure 2:
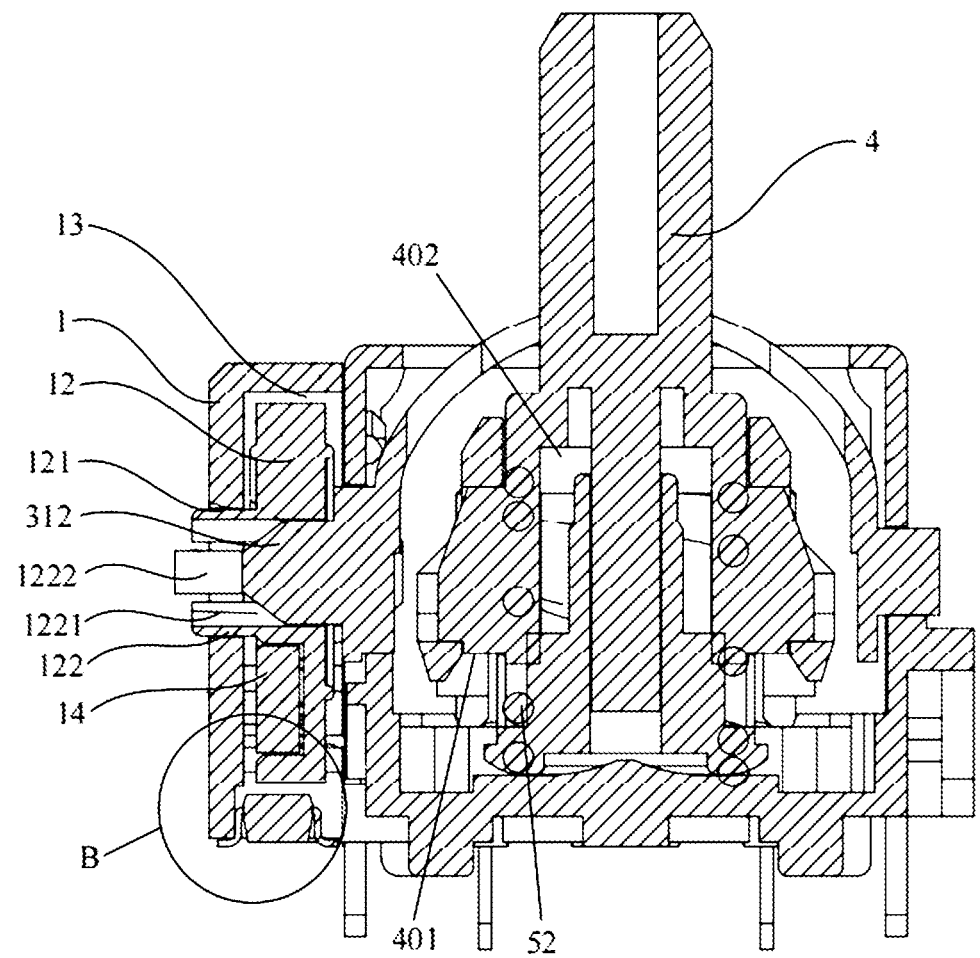
FIG. 2 is a planar cross-sectional view of the Hall joystick according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIGS. 1-3, 7, and 10, in one embodiment, an integrated joystick with Hall elements may include a return spring 52, a transmission member 3 (see FIG. 9), a first side cap 1, a second cap 2, a stick 4, and a main body 5. The main body 5 is hollow and includes a first side surface 501 and a second side surface 502 that are perpendicular to each other. The return spring 52 is arranged within the main body 5. The first side cap 1 and the second cap 2 are respectively fixed to the fist side surface 501 and the second side surface 502. The stick 4 is partly received in the main body 5 and has a lower end 401 rotatably connected to the main body 5. A first rotating member 12 and a second rotating member 22 are rotatably connected to the first side cap 1 and the second side cap 2. Each of the first rotating member 12 and the second rotating member 22 includes a magnet 14 attached thereto. The transmission member 3 is movably arranged in the main body 5 and connected to the stick 4, the first rotating member 12 and the second rotating member 22. The transmission member 3 is to transmit a rotational motion from the stick 4 to the first rotating member 12 and the second rotating member 22, which drives the first rotating member 12 and the second rotating member 22 to rotate with respect to the first side cap 1 and the second side cap 2, respectively. A first Hall element 11 is arranged within the first side cap 1, and a second Hall element 21 is arranged within the second side cap. In one embodiment, the first Hall element 11 may be arranged under the magnet 14 in the first rotating member 12, and the second Hall element 21 may be arranged under the magnet 14 in the second rotating member 22.

In one embodiment, the return spring 52 is to urge the stick 4 to automatically return to its original position (e.g., a position where the stick 4 is vertical and extends along a vertical line passing through the center of the main body 5) when there is no external force exerted on the stick 4. The configuration above enables the magnet 14 inside the first rotating member 12 to rotate and enables the magnet 14 inside the second rotating member 22 to rotate through the transmission member 3. The first Hall element 11 under the magnet 14 inside the first rotating member 12 can detect the change in magnetic field caused by the rotation of the magnet 14 inside the first rotating member 12. The second Hall element 21 under the magnet 14 inside the second rotating member 22 can detect the change in magnetic field caused by the rotation of the magnet 14 inside the second rotating member 22. The first Hall element 11 is arranged within the first side cap 1, and the second Hall element 21 is arranged within the second side cap 2. The first Hall element 11 and the second Hall element 21 are integrally connected with the corresponding side caps. When assembled on the assembly line, rapid assembling can be achieved by insertion of the pins on the first Hall element 11 and the second Hall element 21 to a circuit board. It also realizes the non-contact position detection of the joystick, with long service life, high precision and no drift problem. In addition, the manner in which the first side cap 1 and the second side cap 2 are arranged enables two linear Hall magnetic induction sensors (i.e., the two Hall elements) to detect the position of the stick 4, which has the advantages of simple structure, low power consumption, simple detection operation, and lower cost.

In one embodiment, the internal structures of the first side cap 1 and the second side cap 2 are the same. For example, an in-mold poly-molding process can be used to integrally arrange the first Hall element 11 inside the first side cap 1, and integrally arrange the second Hall element 21 inside the second side cap 2.

In one embodiment, the main body 5 includes therein a rotatable post 51. The spring 52 is arranged around the post 51. The stick 4 defines a hollow space 402, and the post 51 is received in the hollow space 402. An upper end of the return spring 52 abuts against the stick 4. The stick 4 is rotatable together with the rotatable post 51 about a lower end of the post 51 in contact with the main body 5.

The provision of the post 51 enables the stick 4 to automatically return to its original position (e.g., a position where the stick 4 is vertical and extends along a vertical line passing through the center of the main body 5) quickly when there is no external force exerted on the stick 4, and enables the stick 4 to rotate smoothly.

Figure 9:
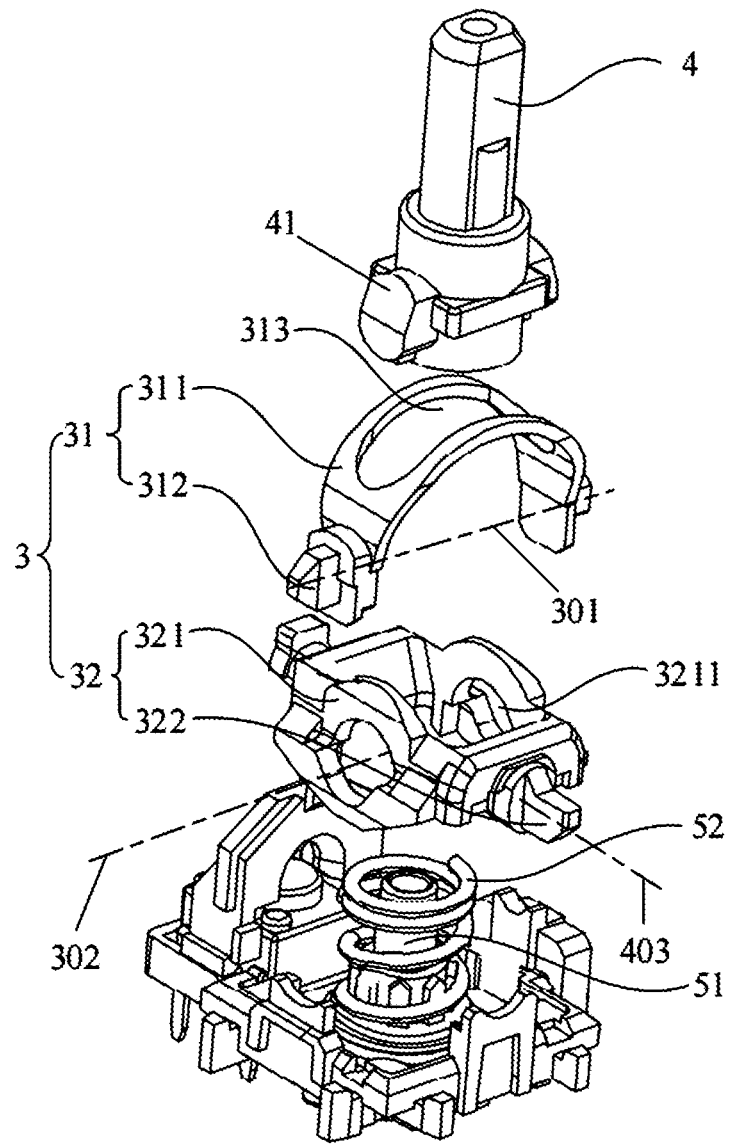
FIG. 9 is another isometric exploded view of the Hall joystick according to one embodiment.
Figure 10:
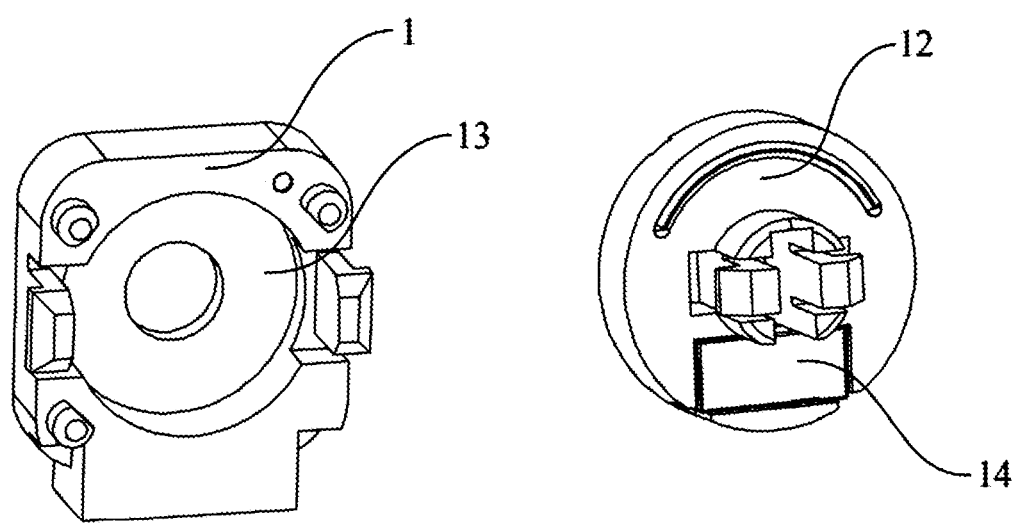
FIG. 10 is an isometric exploded view of a side cap of the Hall joystick according to one embodiment.

Referring to FIG. 9, in one embodiment, the transmission member 3 may include a first transmission member 31 and a second transmission member 32 that are rotatably connected to the main body 5 and rotatable about two different axes 301 and 302. The stick 4 is rotatably connected to the second transmission member 32, and is rotatable about an axis of rotation 403. In the embodiment, the axis of rotation 403 coincides with the axis 301. In the embodiment, the two axes 301 and 302 are perpendicular to each other. In one embodiment, the first transmission member 31 may include a U-shaped body 311, and the second transmission member 32 may include a hollow body 321 that is formed by four sidewalls connected to one another. In the embodiment, two opposite sidewalls define two through holes 3211, and the stick 4 includes two shaft portion 41 that are rotatably received in the two through holes 3211. The first transmission member 31 defines a groove 313 in the U-shaped body 311. The stick 4 passes through the hollow body 321 and the groove 313 and is movable along the groove 313 when the stick 4 rotates together with the second transmission member 32. The stick 4 is to push the first transmission member 31 to rotate when the stick 4 rotates with respect to the second transmission member 32.

In one embodiment, the first transmission member 31 may include a first connection portion 312 connected to the first rotating member 12, and the second transmission member 32 includes a second connection portion 322 connected to the second rotating member 22.

In one embodiment, when the stick 4 rotates about the axis of rotation 403 that is perpendicular to the first side cap 1, the stick 4 will come into contact U-shaped body 311 and push the first transmission member 31 to rotate, thereby causing the first connection portion 312 to rotate. The first rotating member 12 then rotates together with the first connection portion 312, thereby causing the magnet 14 within the first rotating member 12 to rotate. The first Hall element 11 can detect the change in the magnetic field caused by the rotation of the magnet 14 inside the first rotating member 12.

When the stick 4 is pushed by a user to move in the groove 313, the second transmission member 32 rotates about the axis 302 that is perpendicular to the second side cap 2, thereby causing the second connection portion 322 to rotate. The second rotating member 22 then rotates together with the second connection portion 322, thereby causing the magnet 14 within the second rotating member 22 to rotate. The second Hall element 21 can detect the change in the magnetic field caused by the rotation of the magnet 14 inside the second rotating member 22.

Since the first side cap 1 and the second side cap 2 are perpendicular to each other, the stick 4 can move to any point in the main body 5 according to the combination and decomposition of the movement.

Figure 5:
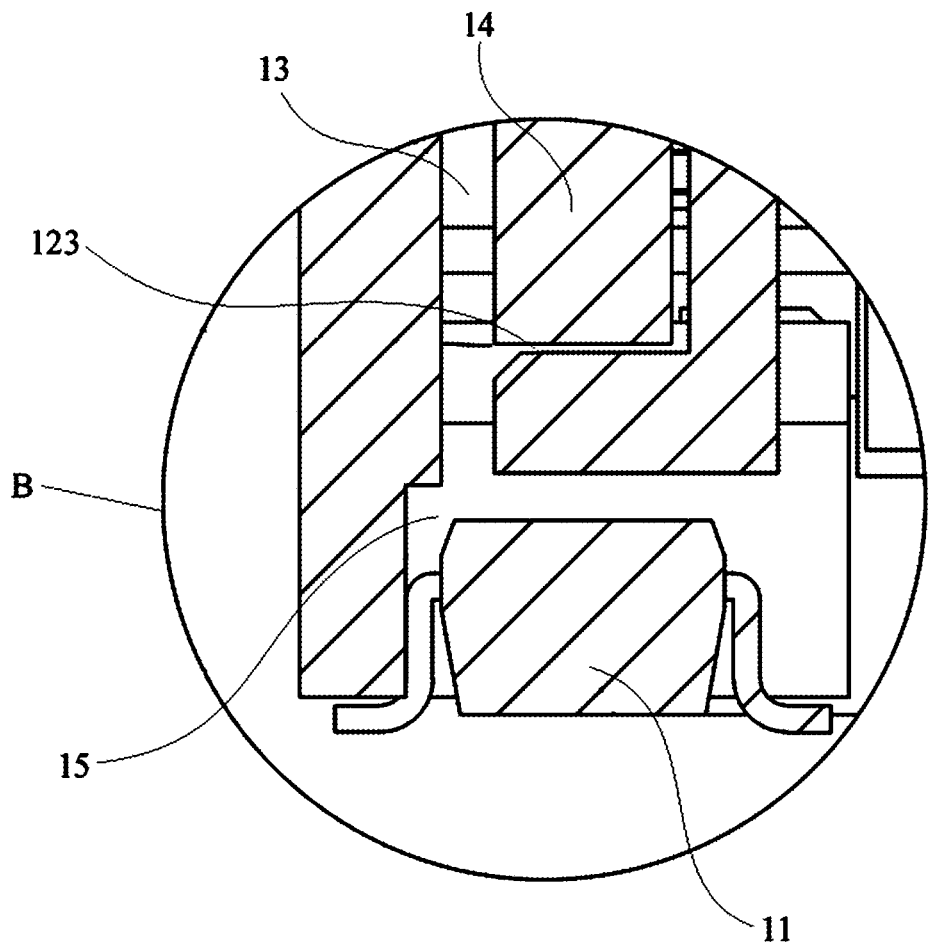
FIG. 5 is an enlarged view of a portion B of FIG. 2.

Referring to FIG. 5, in one embodiment, the first Hall element 11 is arranged under the magnet 14 within the first rotating member 12, and the second Hall element 21 is arranged under the magnet 14 within the first rotating member 22.

In another embodiment, the first Hall element 11 is arranged to face a lateral surface of the magnet 14 arranged in the first rotating member 12, and the second Hall element 21 is arranged to face a lateral surface of the magnet arranged 14 in the second rotating member 22.

It should be noted that the first Hall element 11 and the second Hall element 21 can be arranged at different positions with respect to the magnets 14 depending on actual needs.

In one embodiment, the first rotating member 12 is detachably connected to the first side cap 1, and the second rotating member 22 is detachably connected to the second side cap 2.

The first rotating member 12 can be detached from the first side cap 1, and the second rotating member 22 can be detached from the second side cap 2, which is convenient for assembly and disassembly. The first rotating member 12 and the second rotating member 22 have the same configuration, and the first side cap 1 and the second side cap 2 have the same configuration.

In one embodiment, the magnets 14 are rectangular.

Figure 8:
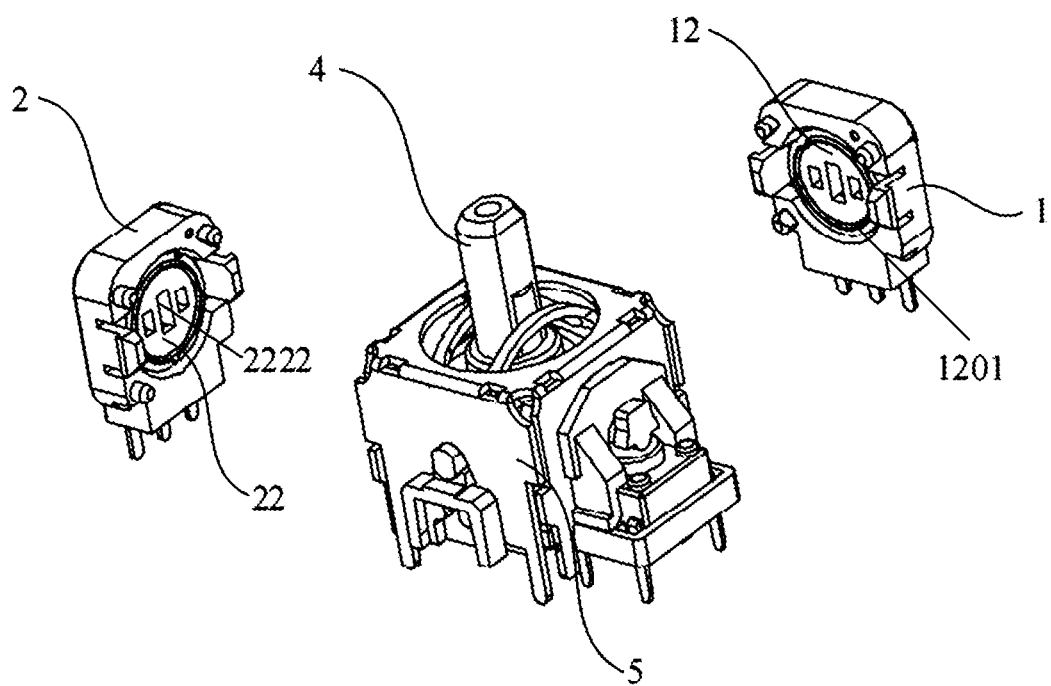
FIG. 8 is another isometric exploded view of the Hall joystick according to one embodiment.

In on embodiment, the first side cap 1 defines a first receiving space 13 (see FIG. 2) to receive the first rotating member 12, and the second cap 2 defines a second receiving space 1201 (see FIG. 8) to receive the second rotating member 22.

In one embodiment, a first protruding portion 122 (see FIG. 2) protrudes from the first rotating member 12, and the first side cap 1 defines a first through hole 121 in communication with the first receiving space 13. The first protruding portion 122 passes through the first through hole 121. A second protruding portion 222 (see FIG. 4) protrudes from the second rotating member 22, and the second side cap 2 defines a second through hole 201 (see FIG. 3) in communication with the second receiving space 1201. The second protruding portion 222 passes through the second through hole 201.

Figure 6:
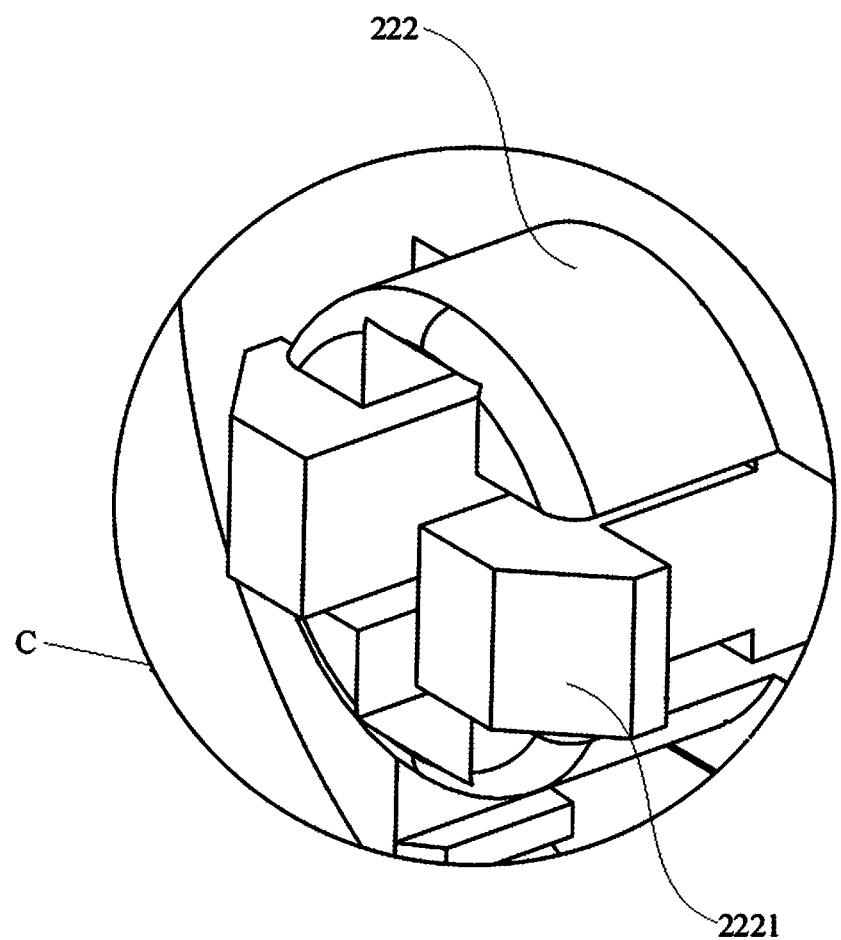
FIG. 6 is an enlarged view of a portion C of FIG. 3.
Figure 7:
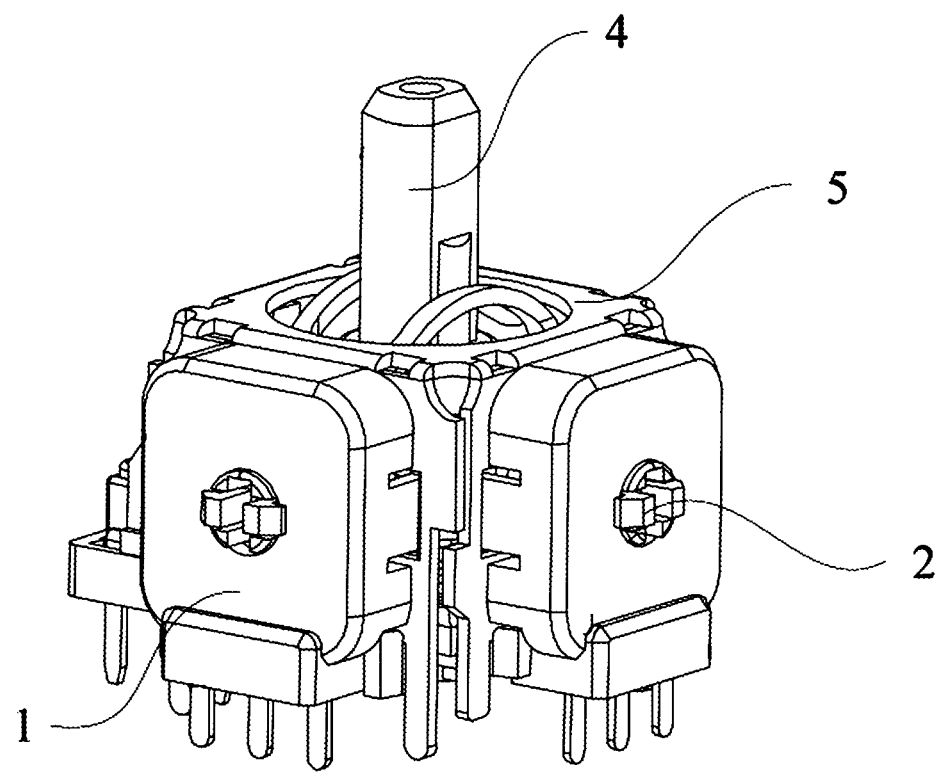
FIG. 7 a schematic isometric view of the Hall joystick viewed from a different perspective.

The first protruding portion 122 includes a fist hook 1222 (see FIG. 2) at an end thereof, and the first hook 1222 extends out of the first through hole 121 and abuts against the first side cap 1. The second protruding portion 222 includes a second hook 2221 (see FIGS. 4 and 6) at an end thereof, and the second hook 2221 extends out of the second through hole 201 and abuts against the second side cap 2.

In one embodiment, the first protruding portion 122 defines a first receiving hole 1221 (see FIG. 3), and the first connection portion 312 is fit in the receiving hole 1221 and abuts against the inner surface of the receiving hole 1221. The first protruding portion 222 defines a second receiving hole 2222 (see FIG. 8), and the second connection portion 322 is fit in the second receiving hole 2222 and abuts against the inner surface of the second receiving hole.

Figure 3:
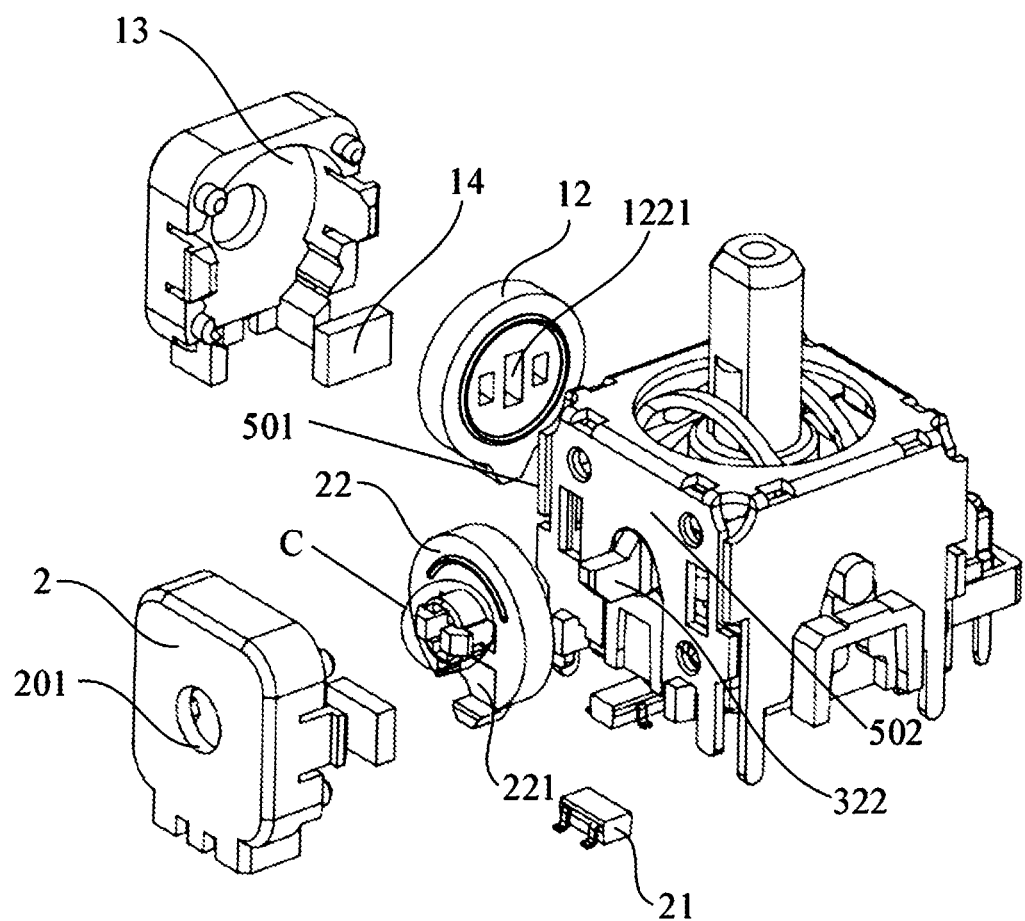
FIG. 3 is an isometric exploded view of the Hall joystick according to one embodiment.
Figure 4:
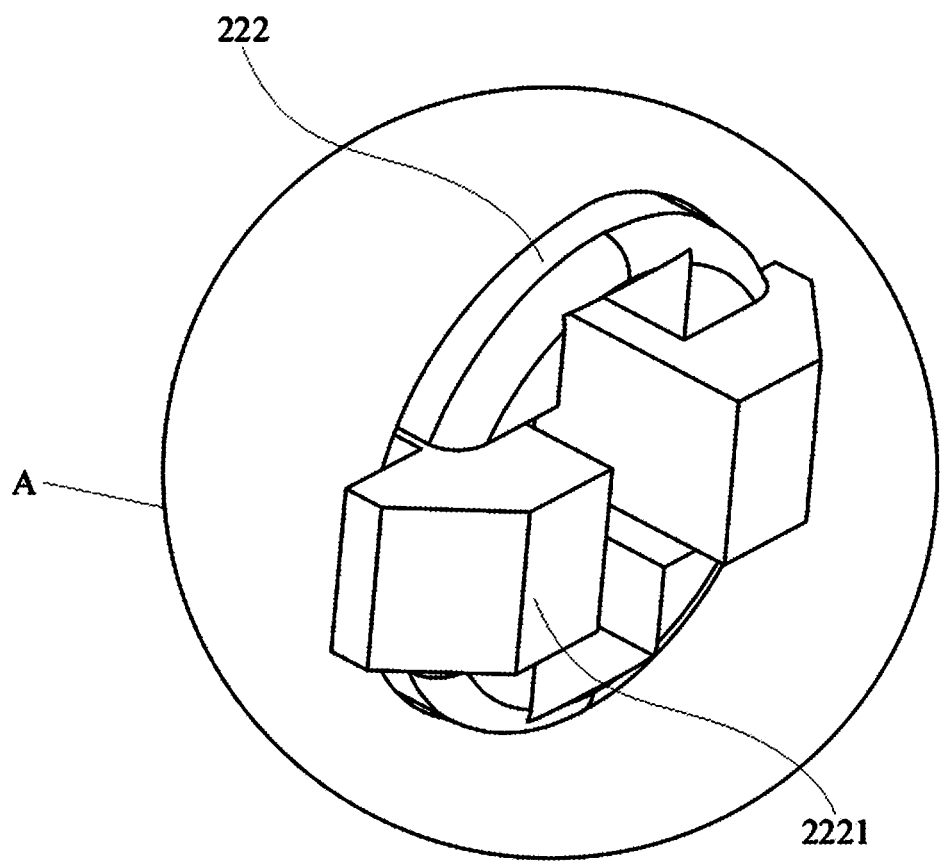
FIG. 4 is an enlarged view of a portion A of FIG. 1.

In one embodiment, the first rotating member 12 defines a first receiving chamber 123 (see FIG. 5), and the second rotating member 22 defines a second receiving chamber 221 (see FIG. 3). The magnets 14 are arranged in the first receiving chamber 123 and the second receiving chamber 221.

In one embodiment, the first side cap 1 defines a first cavity 15 in communication with the first receiving space 13, and the second side cap 2 defines a second cavity in communication with the second receiving space. The first Hall element 11 and the second Hall element 21 are respectively received in the first cavity 15 and the second cavity.

In one embodiment, the first Hall element 11 is fixed to a PCB surface and located under the magnet 14 inside the first rotating member 12, and the second Hall element 21 is fixed to the PCB surface and located under the magnet 14 inside the second rotating member 22.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A Hall joystick comprising:
a main body having a first side surface and a second side surface that are perpendicular to each other;
a first side cap and a second side cap that are respectively fixed to the first side surface and the second side surface of the main body;
a first rotating member and a second rotating member that are rotatably connected to the first side cap and the second side cap, each of the first rotating member and the second rotating member comprising therein a magnet;
a stick partly received in the main body and having a lower end rotatably connected to the main body;
a transmission member movably arranged in the main body and connected to the stick, the first rotating member and the second rotating member, the transmission member configured to transmit a rotational motion from the stick to the first rotating member and the second rotating member;
a return spring arranged in the main body, the return spring configured to return the stick to an original position thereof; and
a first Hall element arranged within the first side cap, and a second Hall element arranged within the second side cap;
wherein the main body comprises therein a rotatable post, wherein the return spring is arranged around the post, wherein the stick defines a hollow space, and wherein the post is received in the hollow space; wherein an upper end of the return spring abuts against the stick, and wherein the stick is rotatable together with the rotatable post;
wherein the first Hall element is integrally connected with the first side cap, and wherein the second Hall element is integrally connected with the second side cap; wherein the first Hall element is arranged to face a lateral surface of the magnet arranged within the first rotating member, and wherein the second Hall element is arranged to face a lateral surface of the magnet arranged within the second rotating member;
wherein a first protruding portion protrudes from the first rotating member, the first side cap defines a first through hole in communication with a first receiving space defined on the first side cap, and the first protruding portion passes through the first through hole; a second protruding portion protrudes from the second rotating member, the second side cap defines a second through hole in communication with a second receiving space defined on the second side cap, and the second protruding portion passes through the second through hole;
wherein the first protruding portion comprises a first hook at an end thereof, and the first hook extends out of the first through hole and abuts against the first side cap; the second protruding portion comprises a second hook at an end thereof, and the second hook extends out of the second through hole and abuts against the second side cap.

2. The joystick of claim 1, wherein the transmission member comprises a first transmission member and a second transmission member that are rotatably connected to the main body and rotatable about two different axes, the stick is rotatably connected to the second transmission member, the first transmission member defines a groove, the stick passes through the groove and is movable along the groove when the stick rotates together with the second transmission member, and the stick is configured to push the first transmission member to rotate when the stick rotates with respect to the second transmission member.

3. The joystick of claim 2, wherein the first transmission member comprises a first connection portion connected to the first rotating member, and the second transmission member comprises a second connection portion connected to the second rotating member.

4. The joystick of claim 3, wherein the first receiving space is configured to receive the first rotating member, and the second receiving space is configured to receive the second rotating member.

5. The joystick of claim 4, wherein the first rotating member defines a first receiving chamber, the second rotating member defines a second receiving chamber, the magnets are arranged in the first receiving chamber and the second receiving chamber; the first side cap defines a first cavity in communication with the first receiving space, the second side cap defines a second cavity in communication with the second receiving space, the first Hall element and the second Hall element are respectively received in the first cavity and the second cavity.

6. The joystick of claim 1, wherein the magnets are rectangular.

7. The joystick of claim 1, wherein the first Hall element is arranged to face a lateral surface of the magnet arranged in the first rotating member, and the second Hall element is arranged to face a lateral surface of the magnet arranged in the second rotating member.

8. The joystick of claim 1, wherein the first Hall element and the second Hall element each comprise a plurality of pins that are operative to be inserted to a circuit board.

9. The joystick of claim 1, wherein the first Hall element is fixed to a PCB surface and arranged under the magnet inside the first rotating member, and wherein the second Hall element is fixed to the PCB surface and arranged under the magnet inside the second rotating member.

10. The joystick of claim 1, wherein the first Hall element and the second Hall element are integrally arranged inside the first side cap and the second side cap, respectively, using an in-mold poly-molding process.

\* \* \* \* \*